US010930135B2

(12) United States Patent
Shoari et al.

(10) Patent No.: US 10,930,135 B2
(45) Date of Patent: Feb. 23, 2021

(54) APPARATUS AND METHODS FOR HYGIENE MONITORING IN RESTAURANTS AND GROCERY SUPERSTORES

(71) Applicant: Arian Shoari, San Diego, CA (US)

(72) Inventors: Arian Shoari, San Diego, CA (US); Mona Komeijani, San Diego, CA (US)

(*) Notice: Subject to any disclaimer, the term of this patent is extended or adjusted under 35 U.S.C. 154(b) by 0 days.

(21) Appl. No.: 16/820,727

(22) Filed: Mar. 17, 2020

(65) Prior Publication Data

US 2020/0219377 A1    Jul. 9, 2020

Related U.S. Application Data

(63) Continuation of application No. 16/093,635, filed as application No. PCT/IB2017/001021 on Apr. 13, 2017, now Pat. No. 10,593,188.
(Continued)

(51) Int. Cl.
*G08B 21/24* (2006.01)
*G08B 25/10* (2006.01)
(Continued)

(52) U.S. Cl.
CPC .............. *G08B 21/245* (2013.01); *B65C 3/08* (2013.01); *B65C 9/40* (2013.01); *G01K 3/005* (2013.01);
(Continued)

(58) Field of Classification Search
CPC .................................................. G08B 21/245
(Continued)

(56) References Cited

U.S. PATENT DOCUMENTS

| 2014/0292518 A1* | 10/2014 | Wildman | G16H 40/63 340/573.1 |
| 2015/0161874 A1* | 6/2015 | Thyroff | G08B 25/10 340/539.11 |
| 2015/0216369 A1* | 8/2015 | Hamilton | A47K 5/1217 222/1 |

* cited by examiner

*Primary Examiner* — Fabricio R Murillo Garcia

(57) ABSTRACT

This disclosure describes methods and apparatus for hygiene monitoring in chain restaurants and grocery superstores. Four sub-systems are introduced to take care of different aspects of hygiene in restaurants. One sub-system uses contactless and in-contact temperature sensors installed on appliances to constantly monitor the temperature of working appliances to be in pre-defined range and use an Internet of Things gateways to transmit the data to remote control unit. The system generate an alert or report if the temperature of the appliances falls beyond the predefined range for more than a specific period of time. Another sub-system use a combination of temperature, humidity, UV and gas detectors to monitor the environment to be unsuitable for growth of fungus and bacteria and alert in case of exposure to harmful material and sun radiation. This sub-system also use an Internet of Things gateways to transmit the data to remote control unit. The third sub-system use a combination of radio frequency tags attached to the staff, RF tag readers and infrared/proximity/motion/microphone/touch sensors installed over the faucet and dispenser to monitor if the staff wash their hands properly after going to the restroom. The forth sub-system automatically generate food expiring label for opened cans and food container based on RF tag worn by the staff. The system generate and print the label whenever the staff gesture their RF tags in front of them and potentially scan the container bar code or select it from a drop-down menu on its touch screen. The last sub-system can also monitor the inventory of opened cans of food in the refrig-
(Continued)

erator and provide a report or alert when they the time gets close to expiration date.

16 Claims, 12 Drawing Sheets

Related U.S. Application Data

(60) Provisional application No. 62/321,906, filed on Apr. 13, 2016.

(51) Int. Cl.
| | | |
|---|---|---|
| *H04B 17/23* | (2015.01) | |
| *H04B 17/318* | (2015.01) | |
| *G08B 21/18* | (2006.01) | |
| *H04M 1/02* | (2006.01) | |
| *H04W 4/02* | (2018.01) | |
| *B65C 3/08* | (2006.01) | |
| *B65C 9/40* | (2006.01) | |
| *G01K 3/00* | (2006.01) | |
| *G01K 13/00* | (2021.01) | |
| *G06K 7/14* | (2006.01) | |
| *G06K 19/06* | (2006.01) | |
| *G06K 19/077* | (2006.01) | |
| *H04L 29/08* | (2006.01) | |
| *H04Q 9/02* | (2006.01) | |

(52) U.S. Cl.
CPC ............ *G01K 13/00* (2013.01); *G06K 7/1413* (2013.01); *G06K 19/06028* (2013.01); *G06K 19/07758* (2013.01); *G08B 21/182* (2013.01); *G08B 21/24* (2013.01); *G08B 25/10* (2013.01); *H04B 17/23* (2015.01); *H04B 17/318* (2015.01); *H04L 67/12* (2013.01); *H04M 1/0202* (2013.01); *H04Q 9/02* (2013.01); *H04W 4/023* (2013.01); *B65C 2009/408* (2013.01); *H04Q 2209/10* (2013.01); *H04Q 2209/40* (2013.01); *H04Q 2209/823* (2013.01); *H04Q 2209/826* (2013.01); *H04Q 2209/84* (2013.01); *H04Q 2209/883* (2013.01)

(58) Field of Classification Search
USPC .................................................... 340/870.07
See application file for complete search history.

FOOD GUARDIAN $Nr$ is the number of receiver antennas
$Mt$ is the number of transmitter antennas

APPARATUS AND METHODS FOR HYGIENE MONITORING IN RESTAURANTS AND GROCERY SUPERSTORES

CROSS REFERENCE TO RELATED APPLICATIONS

This application claims the benefit of U.S. Provisional Application No. 62/321,906 filed on Apr. 13, 2016, and U.S. Non-Provisional application Ser. No. 15/396,493 filed on Dec. 31, 2016 the contents of which are incorporated by reference herein.

COPYRIGHT NOTICE

Some parts of the disclosure of this patent document contain materials that are subject to copyright protection. The owner of the copyright has no objection to the facsimile re-production of this disclosure by anyone as it appears in the Patent and Trademark Office Patent file or records, but otherwise reserves all copyright.

BACKGROUND OF THE INVENTION

According to a CDC report, every year, around 48 million people get sick from a food-borne disease in the United States, from which 128,000 are hospitalized and almost 3,000 people die. The most common food-borne disease agent is the Norovirus which accounts for almost 40% of all outbreaks. When a food related incident happens in one branch of a franchise chain, not only that unit will be penalized by health authorities, but also the entire brand will bear severe losses due to loosing customer confidence. Up until now, no technological solution has been introduced to allow the headquarters to monitor hygiene compliance among their franchise units.

One of the main concerns regarding food hygiene in restaurants and any food processing center is to ensure that the temperature of the appliances and food containers stays at the recommended level (defined by Department of Health). Currently these data is being logged and recorded manually by the staff of the food processing organization. However, this is not only subject to human error but it is also difficult for high level managers to supervise the process. Accordingly, there is a need for a centralized monitoring and control system to log this data and provide a real-time warning in case a temperature falls beyond the acceptable range.

Another source of concern regarding food safety is the hygiene among the staff of the restaurants. For example, there are hand-washing codes dictated by the health organization that the staff should follow. In addition, the staff should not attend the work space if they are ill and have a fever. Unfortunately, at the moment there is no automatic mechanism to monitor staff compliance with these codes without violating their privacy. Restaurants currently rely on the honesty of the staff to report them.

Moreover, the environment temperature and humidity shall be controlled in a restaurant kitchen to make sure that the environment is not suitable for growth of bacteria and fungus.

Furthermore, another issue regarding food safety is the proper labeling of the opened cans and raw meat in the refrigerator. That's because the expiration time of a food product will change whenever the can or container is opened. On the other hand, the raw material or meat may not be used all at once upon opening of the container and the left over may be kept in the refrigerator for future use by another employee. Since this employee may not be the one who originally opened the container, it may be hard for he or she to determine how old the can ingredient is. At the moment, there are certain procedures in place for manual food labeling by the staff, but they may forget to label the opened cans. This can happen due to work pressure, stress or even confusion on calculating the expiration date based on the type of ingredient.

This patent application will address all these issues separately and provide hygiene monitoring sub-systems that can be used by managers to get real-time feedback about the level of compliance with food safety codes in each remote franchise unit. Needless to say, that each sub-system may be implemented individually or in combination to other sub-system to provide cost effective solution based on customer requirements.

Our combined system can help managers of chain restaurants and grocery super-stores to remotely monitor the level of hygiene compliance among the franchise units; promote a good reputation among their patrons; reduce the risk of contamination, fines, and lawsuits; get real time feedback that allows immediate correction; reduce maintenance costs by identifying the need for service sooner; and reduce the insurance premium related to "accidental contamination" clause by proving the business is highly monitored.

SUMMERY OF THE INVENTION

This application describes apparatus and methods for hygiene monitoring in chain restaurants and grocery super-stores. The system contains 4 sub-system each of them may be implemented separately or combined with other sub-systems and monitor different aspects of food safety. One of the sub-system includes: measuring temperature by plurality of thermometer or thermostat, transferring the data regarding the temperature inside appliances, heaters, coolers, refrigerator to a central monitoring unit; setting predefined value range for healthy functionality of each heating, cooling, appliances unit; reporting or alarming if the temperature falls out of range for a specific period of time. The other sub-system does similar thing for temperature of the environment in addition to storing data and generate alarm based on humidity/gas and other environment related sensors. The third sub-system track the location of staff in the environment and check their compliance with hand-washing policy of the organization. The forth subsystem generate automatic food labels for opened cans based on RF tag worn by the staff.

DETAILED DESCRIPTION

The present invention provides a system and methods to constantly monitor (and/or control) the level of compliance with key hygiene criteria in restaurants, grocery super stores, franchise units, hotels and resorts, and other food processing factories.

Our total monitoring system comprises of one or more of the following sub-systems. Any combination of following sub-systems may be employed to design the total hygiene monitoring system depends on customer requirements and application economy. Alternatively, any sub-system may be employed individually as a separate monitoring system.

Following is the list of sub-systems:
A) Appliance monitoring sub-system.
B) Environment monitoring sub-system.
C) Staff monitoring sub-system.
D) Automatic food labeling sub-system.

Figure 1:
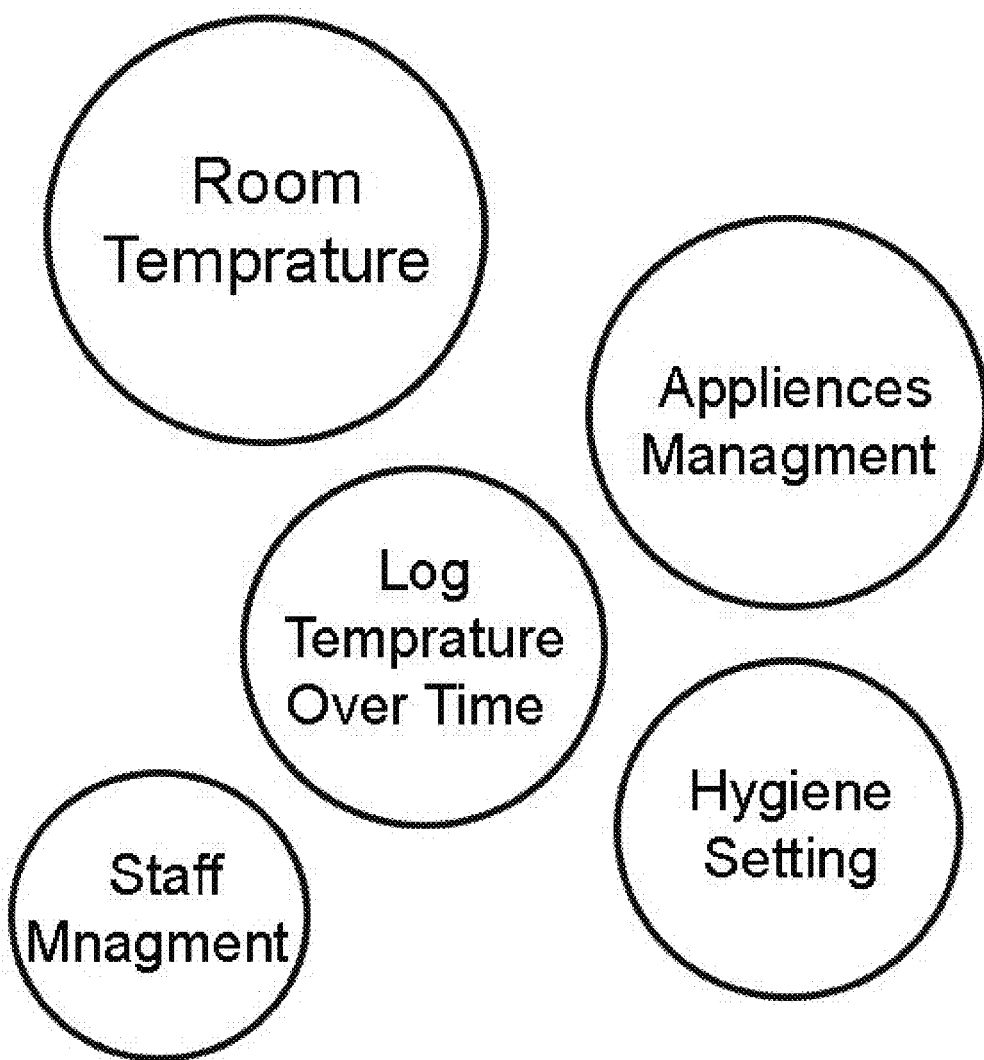
FIG. 1: Different sub-systems of hygiene monitoring system

FIG. 1 shows different parts of a total hygiene monitoring solution.

A) Appliances Monitoring Sub-System.

Two common sources of food contamination in restaurants or any other food processing facilities are appliances not maintaining a healthy temperature, or the meat being kept outside hot/cold zone for more than 2 hours. To address these issues, certain procedures are in place to measure and record the appliances' temperatures but the process is manual and time-consuming and sometimes the staff forget to follow these procedures, therefore, we hereby propose an Internet of Things (IoT) solution which gather useful sensors data and store them in a central application that can both generate real-time alerts or log the history for future reference. The system optionally may contain mechanisms to control the temperature or change settings of the appliances by accessing their microcontroller through the internet remotely.

Figure 2:
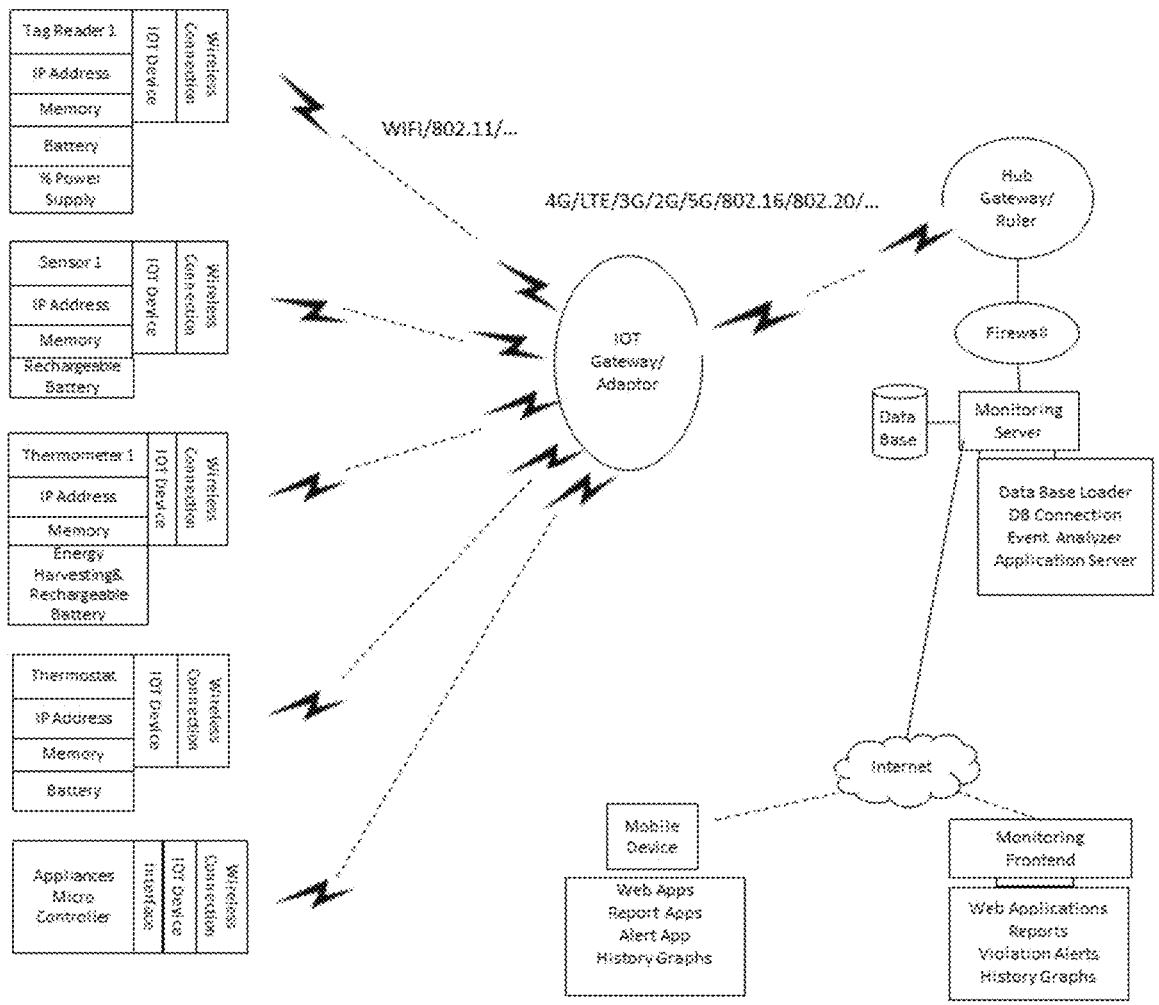
FIG. 2: A system overview of the hygiene monitoring system

The "appliances monitoring sub-system" comprises a plurality of temperature sensors (or thermostats) installed on the restaurants' appliances such as refrigerators, freezers, ovens, stoves, grills, heaters, warmers, dish-washers, ice-makers, soft drink mixers and dispensers, ice cream dispensers, coffee makers, toasters, fryers, etc.; plurality of interfaces to read the sensors data and possibly log them in an attached on-chip memory; an Internet of Things (IoT) adaptor unit (or a wireless router, hub, switch or gateway) that receives the data from all sensors and organize them in a packet format to be sent to a central unit; wireless connections between sensor units and internet of Things (IoT) adaptor unit (or a wireless router, hub, switch or gateway); and a central unit which can be located on a remote server which keeps the hygiene monitoring information from all restaurants' branches. A high level design of the sub-system has been illustrated in FIG. 2.

In another embodiment, instead of using separate temperature sensors for appliances, the system employs smart interfaces to read and download data directly from appliances microcontrollers (for example the one used in ovens or refrigerators).

The sub-system gathers useful data from all appliances and store them in a database located in the central monitoring unit. Therefore, the central monitoring unit captures an informative snapshot of all appliances and room temperatures in any restaurant unit. The reports would be available in real-time to franchise headquarters and possibly on the managers' smartphones. The system can also provide real-time alerts whenever the temperatures are not set correctly or when there is a failure in an appliance. Hence, the system is also useful in decreasing the maintenance cost and energy consumption.

In another embodiment, instead of a central unit installed on a remote server, each restaurant unit has its own franchise monitoring unit which will handle all monitoring task for that specific unit and optionally transmit reports or feedback to the central monitoring unit which is installed in a separate location.

The Internet of Things (IoT) adaptor unit can act as a gateway to collect data and transmit them over a mobile wireless network.

The Internet of Things adaptor may be compatible with mobile standards such as 5G, 4G, LTE, 3GPP, Bluetooth, BTLE, Zigbee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

Figure 3:
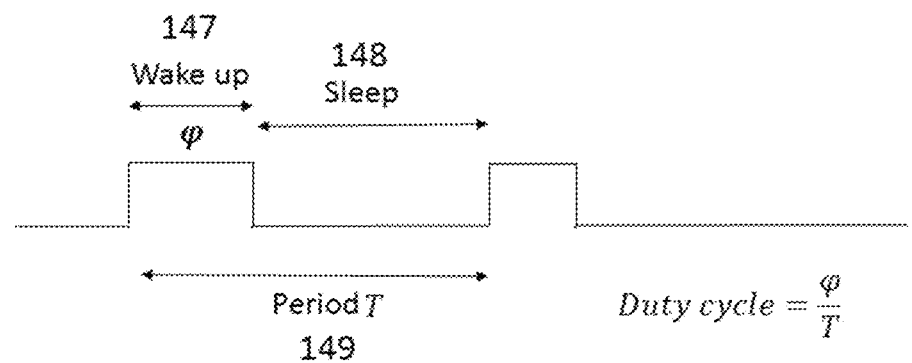
FIG. 3: Wakeup-sleep cycles and relevant parameters

In one embodiment, the temperature sensors installed on appliances may become enabled based on an adjustable duty cycle on a periodic basis. This helps the sensor device save energy on the sleep cycle as demonstrated in FIG. 3. The duty cycle and period of wakeup-sleep may be different for different type of sensors. In addition, these parameters may adaptively be controlled through a feedback from the device battery. This may help the battery require less frequent charging.

In one embodiment, the central database is co-located with the central control unit and stores all raw data from the sensors. Alternatively, the application server may analyze the data and stores the useful information or aggregated data in the database.

In one embodiment, the temperature sensors have on-chip memories that store different temperature values in a specific period of time. These values will be sent to the Internet of Things (IoT) adaptor unit (or a wireless router, hub, switch or gateway) periodically or upon some event to save energy on the data transmission and to ensure successful delivery of data. For example, a temperature sensor inside the refrigerator may be programmed to store the temperature history from previous transmission and send it on a burst of communication whenever the refrigerator's door is open.

In addition, the application may be developed using readily available IoT platforms such as ThingSpace, ThingShadow, OpenXC or etc.

Figure 4:
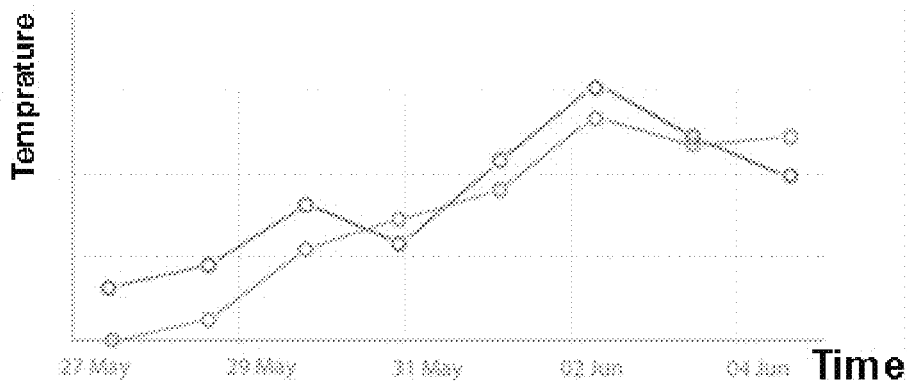
FIG. 4: A history graph of appliances' temperatures during a specified period
Figure 4:
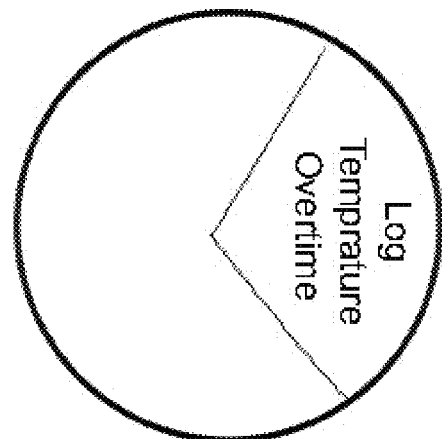

Allowed temperature range for each appliance may be set by monitoring staff based on the appliance's manual and in accordance with hygiene codes dictated by federal or state health organizations. The system will generate an alert if the appliances is on for a preset duration of time and the temperature is not stabilized in the allowed range. It may also generate history graphs of each appliance's temperature over time. Alternatively, these graphs may show the average number of violations per day. FIG. 4 shows a user interface design for graphical illustration of appliances' temperatures history during a specified period.

The reports regarding each restaurant unit would be available real-time in franchise headquarters. The system can also provide real-time alert whenever the temperature is not set correctly or when there is a failure in the appliances. Hence, the system is also useful to decrease maintenance costs and to ensure that equipment is running effectively.

Optionally, the changes in current and voltage of the appliances may be measured and transmitted to the central unit through the Internet of Things adaptor. This data may be analyzed and used in central monitoring unit to identify a possible failure in the system or the need for a maintenance inspection.

The system may optionally send alert or report to managers' smartphone on a real time basis through short message service (SMS) offered by mobile operators.

One skillful in the arts would know that similar techniques and apparatus can be used to monitor food safety in any other organization dealing with food preparation or processing including food markets and superstores, catering facilities, food factories, bakeries, fast food chains, day care kitchens, hospital kitchens, nursery kitchens, and so on.

B) Environment Monitoring Sub-System.

Environment monitoring sub-system is comprised of a plurality of temperature and humidity sensors installed in different locations of the restaurant including the kitchen, the dining room, the bar table, the buffet table, etc.; plurality of interface to read the sensors data and possibly log them in an attached on-chip memory; an Internet of Things (IoT) adaptor unit (or a wireless router, hub, switch or gateway) that receive the data from all sensors and organize them in a packet format to be sent to a central unit; wireless connections between sensor units and IoT adaptor unit (or a wireless router, hub, switch or gateway); and a central unit which can be located on a remote server which keeps the hygiene monitoring information from all restaurant branches.

The system may optionally include CO, CO2, CH4, O2, O3, Chlorine and UV sensors to provide feedback and alerts regarding the quality of the air, and possible exposure to harmful sun radiation or toxic material.

The sub-system gathers useful data from different parts of the facility and store them in a database located in the central monitoring unit. Therefore, the central monitoring unit captures an informative snapshot of the room temperatures and humidly in any part of the restaurants' units. This data is useful to keep the environment incompatible with bacteria and fungus growth. In addition, it may optionally provide feedback regarding the quality of the air in the facility or revealing poisoning gases such as CO.

In one embodiment, the central database is located in the central control unit and stores all raw data from the sensors. Alternatively, the application server may analyze the data and only stores the useful information or aggregated data in the database.

The reports would be available in real-time to franchise headquarters and possibly on the managers' smartphones. The system can also provide real-time alerts whenever the temperatures are not set correctly or when there is a failure in an HVAC or Heating system. Hence, the system is also useful in decreasing the maintenance cost and energy consumption.

In another embodiment, instead of a central unit installed on a remote server, each restaurant unit would have its own franchise monitoring unit. This unit would handle all monitoring tasks for that specific unit and optionally transmit reports or feedback to the central monitoring unit installed in a remote location.

The Internet of Things adaptor may be compatible with mobile standards such as 5G, 4G, LTE, 3GPP, Bluetooth, BTLE, Zigbee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

In addition, the application may be developed using readily available IoT platforms such as ThingSpace, ThingShadow, OpenXC, etc.

Acceptable temperature range for each environment may be set by monitoring staff in accordance to hygiene guidelines provided by health organizations. The system will generate alerts if the room temperature falls beyond the preset values during or after working hours. It may also generate historical graph for temperature or humidity of each room. Alternatively, it may show the average number of violations per day.

The reports regarding each restaurant unit would be available real-time in franchise headquarters. The system can also provide real-time alerts whenever the temperature is not set correctly or when there is HVAC or heating system. Hence, the system is also useful to decrease maintenance costs and insure that ventilation system is running effectively.

Figure 5:
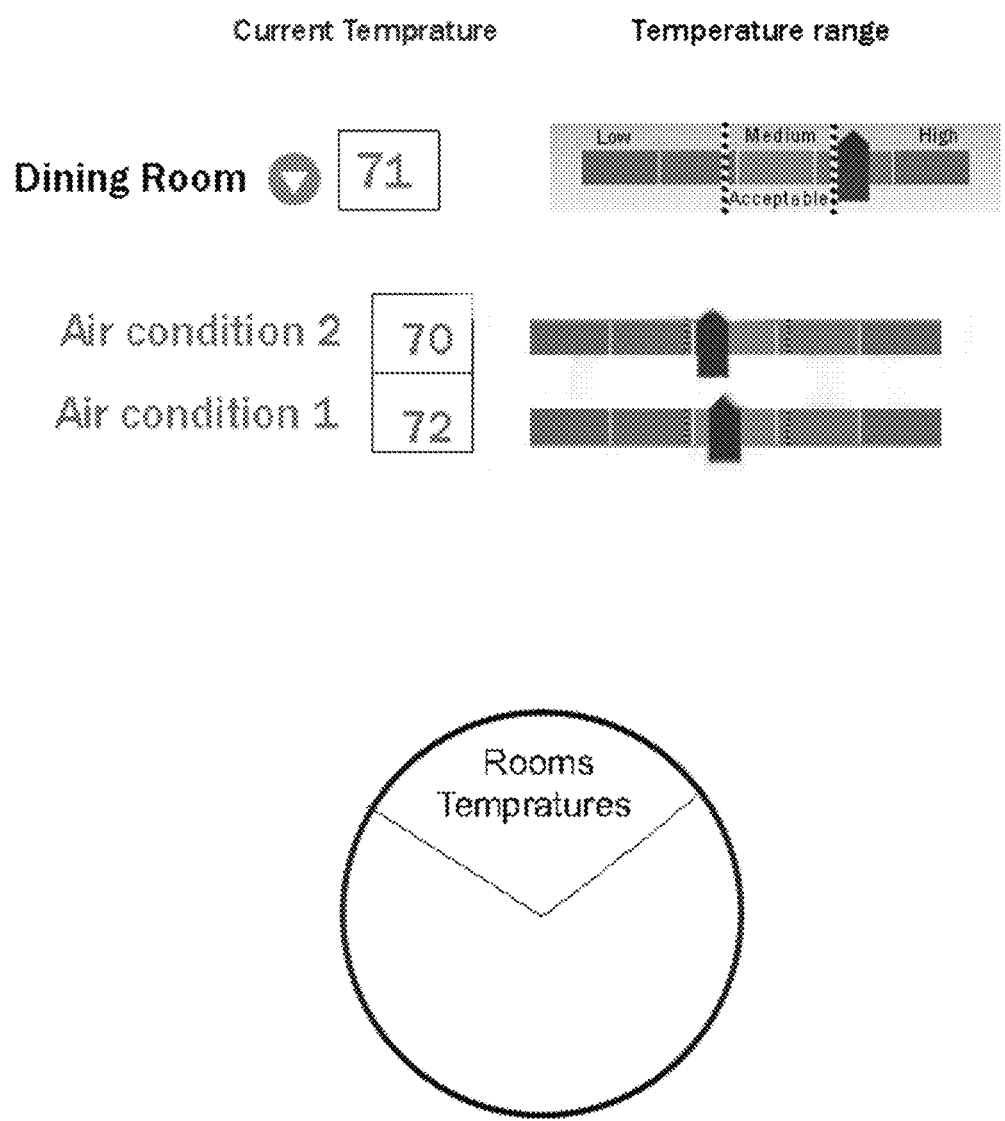
FIG. 5: Temperature monitoring of the environment

FIG. 5 shows a user interface design for temperature monitoring of the environment.

The environment monitoring sub-system may optionally employ smart plates and smart glasses. These plates have temperature and infrared or UV sensors attached to them. The sensors enable them to sense if they are empty and inform the waiter/waitress to ask the patron if she/he needs a refill. In addition, it may record and report the amount of time between the full plate leaving the kitchen hot zone and arriving at the table. The system may optionally give a warning if the full plate is outside hot/cold zone for a specific period of time. In addition, it may optionally monitor temperature of the food on the plate.

In one embodiment, the sensors installed in the environment may become enabled based on an adjustable duty cycle on a periodic basis. This helps the sensor device to save energy on the sleep cycle as demonstrated in FIG. 3. The duty cycle and period of wakeup-sleep may be different for different types of sensors. In addition, these parameters may adaptively be controlled through a feedback from the device battery. This may help the battery require less frequent charging.

In one embodiment, environment sensors have on-chip memories that store their measured values in a specific period of time. These values will be sent to the Internet of Things (IoT) adaptor unit (or a wireless router, hub, switch or gateway) periodically or upon some event to save energy on the data transmission and to ensure successful delivery of data. For example, a CO or a humidity sensor may be programmed to store its measurements from previous transmission and only send it whenever the current measured value is over some threshold or whenever its buffer becomes full. In another example, a temperature sensor installed on the buffet table may start transmitting the temperature stored value if its buffer becomes full or the temperature falls beyond the acceptable range.

In addition, the data from the buffer may be transmitted to the central unit on a burst of communication to save energy on the transmission.

The environment monitoring sub-system may be combined with appliance monitoring sub-system to provide a more comprehensive feedback to the managers and certified food safety managers.

The system may optionally send alert or report to managers' smartphone on a real time basis through short message service (SMS) offered by mobile operators.

One skillful in the arts knows that similar techniques and apparatus can be used to monitor food safety in any other organization dealing with food preparation or processing including food markets and superstores, catering facilities, food factories, bakeries, fast food chains, day care kitchens, hospital kitchens, nursery kitchens and so on.

C) Staff Monitoring Sub-System.

This sub-system contains methods for automatically checking the staff compliance with hand-washing codes defined by health organizations in restaurants and food processing facilities without jeopardizing anyone's privacy.

In chain restaurants and grocery stores. Although there are certain procedures and guidelines in place to follow food safety regulations, they do not have any tangible mechanisms to guarantee fulfillment of those guidelines in a single franchise other than random inspections. So the same sub-system would benefit restaurantours to have more control over their branches' food processing and hygiene.

The sub-system comprise of radio frequency tags or beacons worn by organization staff (for example RFiD or Bluetooth Tags); a plurality of RF tag readers or base-stations installed on different locations in the restaurant; infrared/proximity/motion/microphone/sonar touch sensors installed over the faucet and dispenser; an Internet of Things (IoT) adaptor or gateway unit (or a wireless router, hub, switch or gateway) that receives the data from all sensors and organize them in a packet format to be sent to a central unit; wireless connections between RF tag readers or sensor units and Internet of Things (IoT) adaptor unit (or a wireless router, hub, switch or gateway); a central unit which can be located on a remote server which keeps the hygiene monitoring information from all restaurants branches in a database; and the algorithm and applications which allow owners of restaurants to monitor the hygiene compliance in each individual franchise.

The staff were supposed to wear radio frequency tags which would be used to identify their movements in the unit. The system generates a flag whenever the employee leaves kitchen station or goes to the restroom and will not clear the flag unless that person stands behind the faucet for a specific period of time, uses the dispenser, and rubs her/his hands properly.

In one embodiment, these radio frequency tags can be worn on the users' shoe (either built into the shoe, built into the insole, or attached to the exterior of the shoe). Several tag reader units would be installed on each specific area of interest, for example kitchen, restaurant's dining room, restroom area and in front of the faucets. The tag readers may be installed on the ground or close to the ground to make the distance between RF tags and reader independent from the height of the person. Several infrared units will be installed on the faucet and dispenser. These units have small signal processing/microcontroller chips attached to them which can calculate other data like the duration that the faucet was open and report it to the central monitoring system through the IoT adaptor (or a wireless router, hub, switch or gateway).

In one embodiment, the central database is located in the central control unit and stores all raw data from the sensors. Alternatively, the application server may analyze the data and only stores the useful information or aggregated data in the database.

Figure 6:
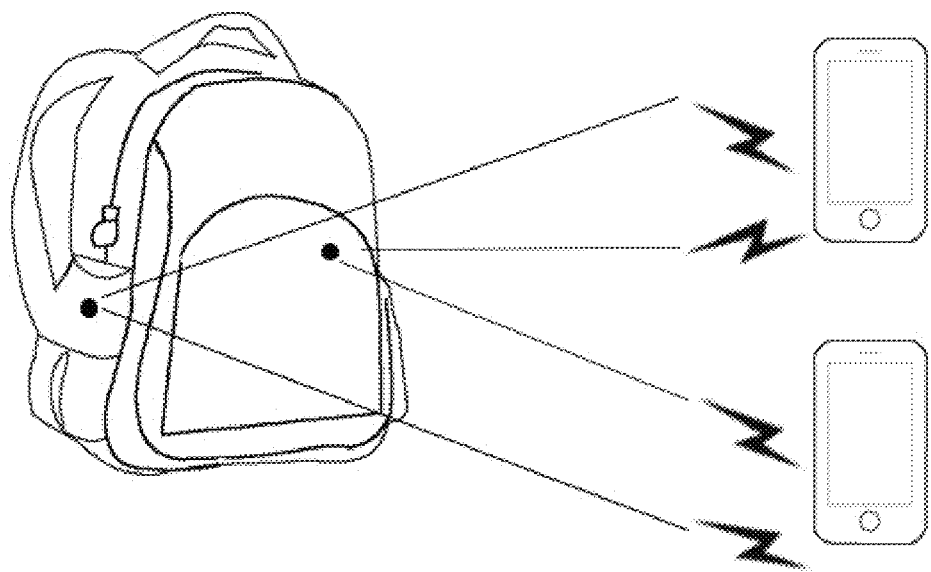
FIG. 6: An object localizer system employing two closely attached beacons and two base-stations (smartphones). The base-stations share data with each other to improve accuracy of location estimation.

In an alternative embodiment the data received from RF beacons at base stations will be used to localize and track the employee movement in the organization. This data may be used in conjunction with the map of the unit to identify and log which room has been visited by the user and when. The localization may be done through, for example, measuring received signal strength indicator (RSSI) of the RF beacon in multiple fixed base stations installed around the facility (FIG. 6), normalizing the values with the transmit power of the beacon, querying an RSSI-distance mapping database to estimate the distance of the user from each fixed base station, and using trilateration/multilateration techniques.

Figure 7:
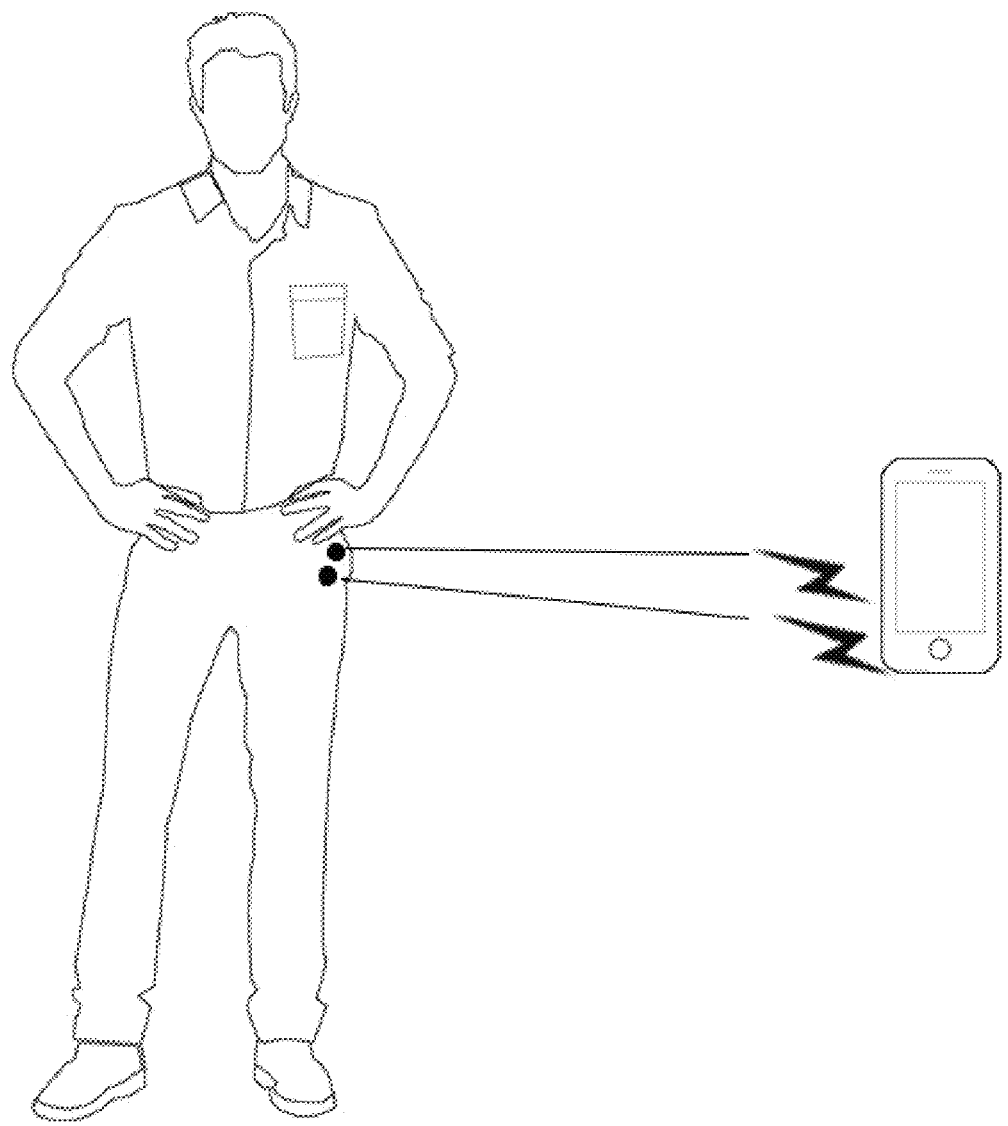
FIG. 7: An object localizer system employing two co-located beacons and one base station.
Figure 8:
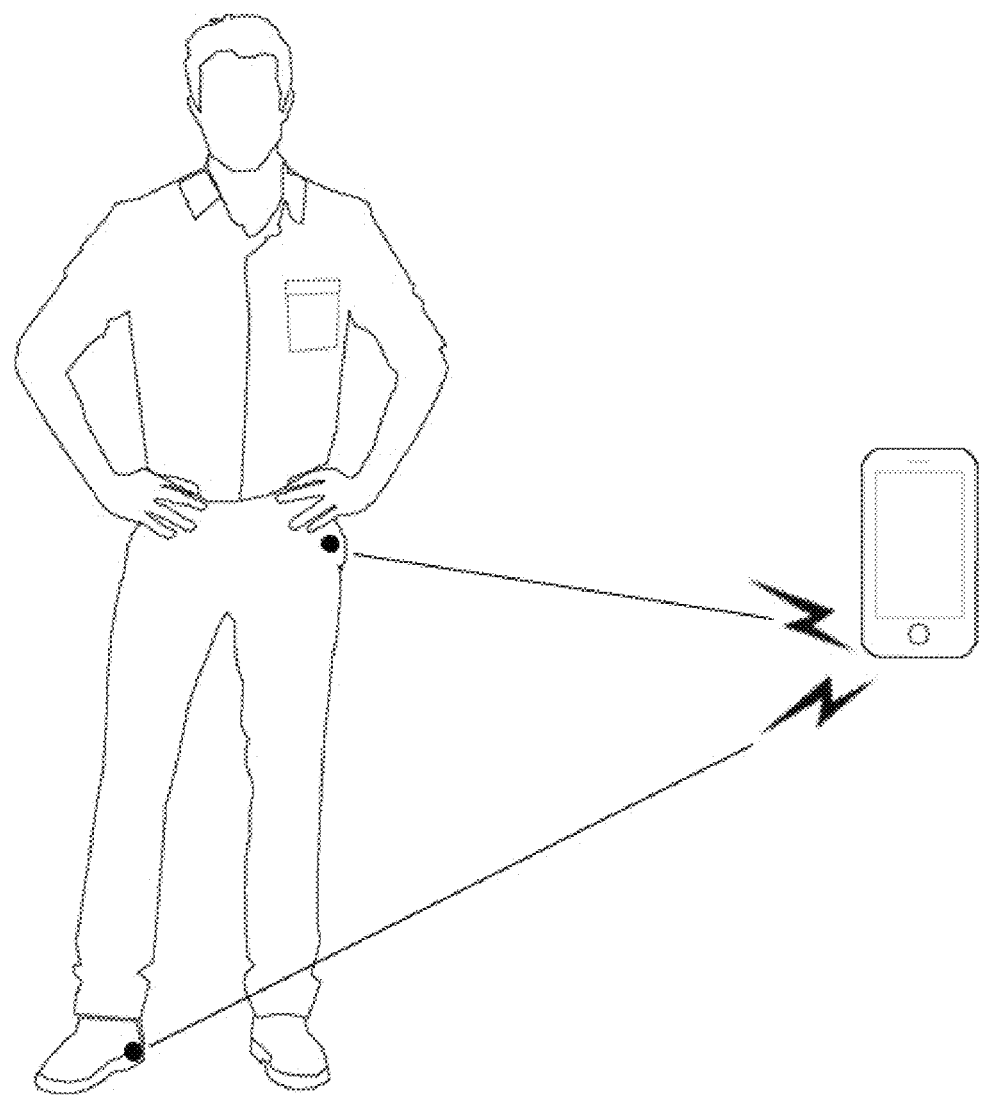
FIG. 8: A localizer scheme employing two beacons worn by the user and one base station.

In an alternative implementation, two or more tags are worn by the user in different parts of the body as illustrated in FIGS. 7-8 and a reference RSSI would be calculated from a combination of RSSI values from these tags before querying the RSSI-distance mapping database. For example, the larger RSSI value from these two could be selected as the reference RSSI to query the mapping database to find corresponding distance.

$$RSSI_{ref}=\max(RSSI_1, RSSI_2)$$

In an alternative implementation, to reduce the effect of noise and fading a time average of RSSI values would be used to calculate RSSI reference values. This scheme may be useful to improve the accuracy of the localization technique.

$$RSSI_{ref}=\text{AVERAGE}(RSSI_i)$$

In addition, if active tags selected for implementation, they may optionally use energy harvesting techniques (for example from a solar or motion energy source), to lengthen the battery life.

Figure 9:
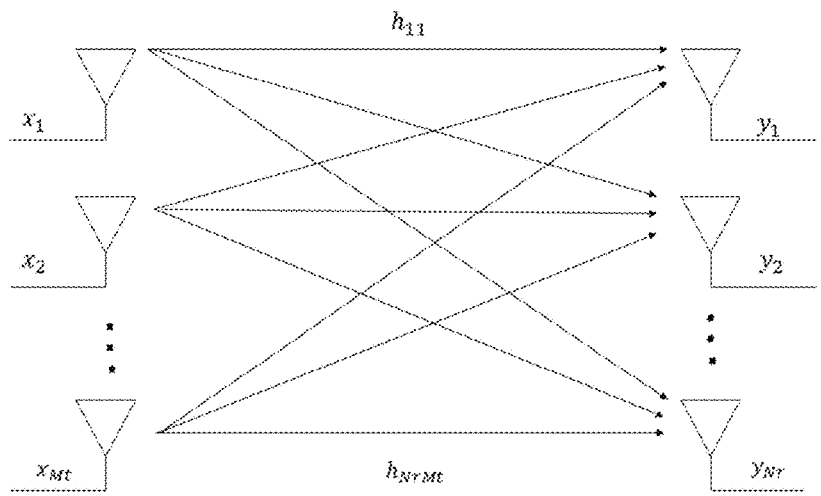
FIG. 9: RSSI matrix calculated for multiple transmitter and receiver antennas.

In another embodiment, the relative distance and location of the tags would be evaluated based on signals transmitted from plurality of transmitter antennas on the RF beacon (or RF tag) to plurality of receiver antennas on the RF tag reader. For example, the RSSI matrix calculated from each signal traveling between each transmitter and each receiver signal may be used to estimate the distance from the center of transmitter antennas to the center of receiver antennas (FIG. 9). This scheme may be useful on mitigating the effect of fading, noise and other uncertainties on RF signals.

Optionally, the same techniques and methods described for localization may be employed using acoustic/sonar transmitters and receivers instead of radio frequency beacons and receivers.

Infrared/proximity/motion/touch/microphone/sonar sensors installed over the faucet and dispenser alongside a radio frequency reader installed in the vicinity of the faucet may be employed to identify who stands behind the faucet, whether the person robbed his/her hands properly during washing or not, if the faucet was open during washing and with what flow strength, if the person uses soap, and how long each process has taken to be completed. They may also be used to change the status of the sensor from sleep to ready (or wakeup) status so as to save energy when no one is around.

Figure 10:
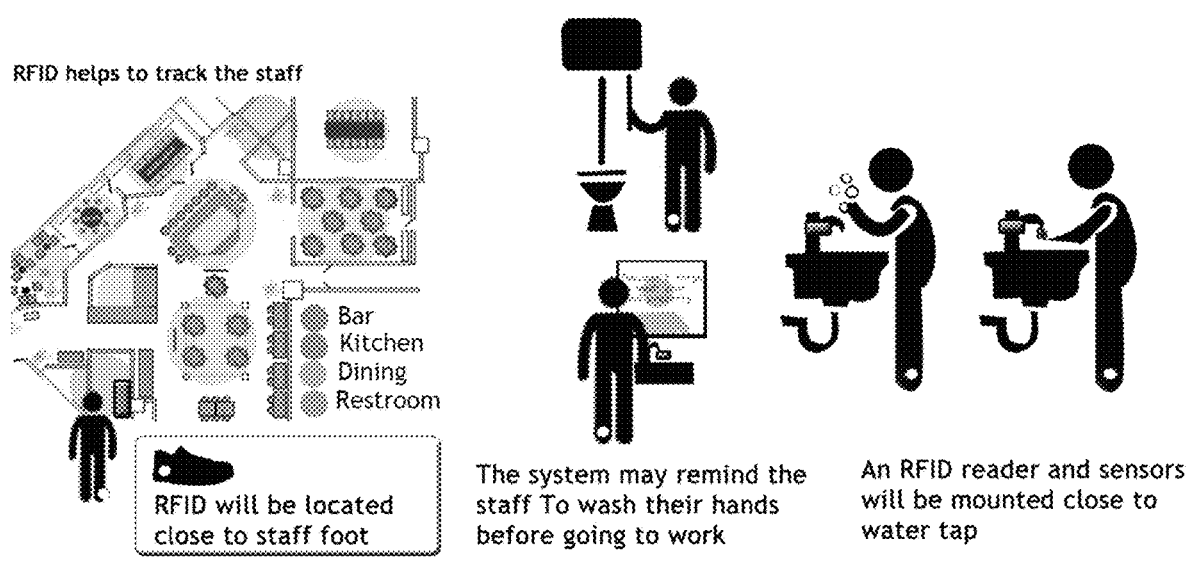
FIG. 10: A detail overview of the washing-hand compliance sub-system

FIG. 10 shows a detailed overview of the washing-hand compliance sub-system.

In one embodiment, the sensors installed over the faucet and dispenser (or the radio frequency readers) may become enabled based on an adjustable duty cycle on a periodic basis. This helps the sensor device to save energy on the sleep cycle as demonstrated in FIG. 3. The duty cycle and period of wakeup-sleep may be different for different types of sensors. In addition, these parameters may adaptively be controlled through a feedback from the device battery. This may help the battery require less frequent charging.

The central monitoring center will group the events based on the received time stamp and interpret the behavior of the staff to extract if he/she has washed their hands after leaving the kitchen and with what quality (quality will be determined from the time the faucet was open, if they robbed their hand properly and if she/he has used dispenser to get soap). The central monitoring unit will then provide alert and report about the level of hand-washing compliance among the employees of each restaurant unit in accordance with hygiene codes dictated by appropriate health organization. The system may optionally log a historical graph of the number of violations by each individual or restaurant unit.

Figure 11:
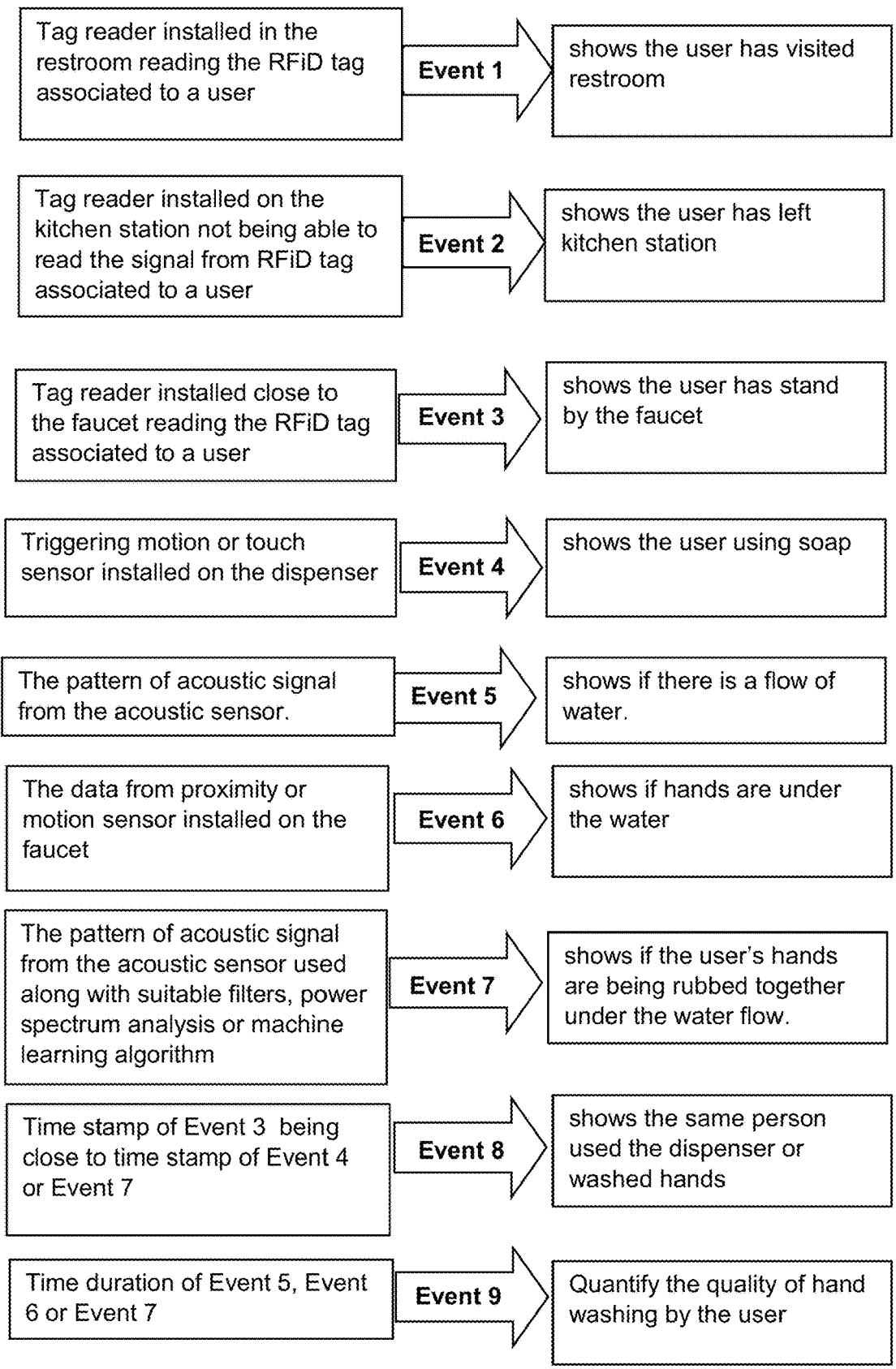
FIG. 11 A relation diagram between washing-hand events and information extracted from sensed data

FIG. 11 shows an example of how information about the employee's hand-washing behavior may be inferred from sensed data by analyzing the signals from the sensors and considering the duration and the sequence of events.

The Internet of Things (IoT) adaptor unit can act as a gateway to collect data and transmit them over mobile wireless network. The mobile network may be one which is compatible with mobile standards such as 5G, 4G, LTE, 3GPP, Bluetooth, BTLE, Zig bee, Glowpan, GPRS, or GSM Edge.

The Internet of Things adaptor may also be compatible with communication standards defined for wireless Local Area Network (LAN), wireless Metropolitan Area Network (MAN), wireless Regional Area Networks (RAN) and/or wireless Broadband Wireless Access (BWA) including different versions of IEEE 802.11, IEEE 802.15, IEEE 802.16, IEEE 802.20 and IEEE 802.22, WiFi, WiMax and etc.

The reports regarding each restaurant unit would be available real-time in franchise headquarters (regardless of their distance from). The system can also provide real-time alerts whenever an employee does not meet their standards. In addition, the system may use internet protocol and applications designed for smartphone, tablets or PCs to provide the manager of each restaurant unit or the corporate managers access to the real-time feedback and reports.

The software applications may be developed using readily available IoT platforms such as ThingSpace, ThingShadow, OpenXC or etc.

The sub-system not only is useful for hygiene control but may optionally provide feedback for staff management. This could be done for example by tracking how much time a staff member spends in different parts of the restaurant and how active they were in serving the customers.

Figure 12:
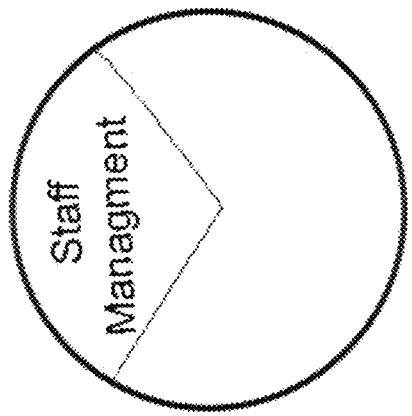
FIG. 12: A front-end hygiene monitoring app designed to display reports and alerts on managers' mobile device about staff location and washing-hand compliance

FIG. 12 illustrates a front-end hygiene monitoring app designed to display reports and alerts on managers' mobile device.

The system may optionally use any other RF enabled tag such as Bluetooth tag instead of RFiD tags. In addition, the system may employ two different types of tags simultaneously to increase accuracy of staff localization. Moreover, a passive or active RFiD tags or one that use energy harvesting, (for example from a solar or motion energy source) may be used depending on the economy of the solution and specific client requirement.

The system optionally may remind the staff to wash their hands after going to restroom, leaving the kitchen station, or upon starting the work shift.

One skillful in the arts knows that similar techniques and apparatus can be used to monitor food safety in any other organization dealing with food preparation or processing including food markets and superstores, catering facilities, food factories, bakeries, fast food chains, day care kitchens, hospital kitchens, nursery kitchens and so on.

D) Automatic Food labeling Sub-System.

Our system has an automatic food expiration labeling system which can extract staff ID from their radio frequency tag (for example RFiD or Bluetooth tag) and generate the label in an easy, fast way on an in-house label printer.

Figure 13:
FIG. 13: A sample label generated automatically by reading RF tag worn by the user

The staff may gesture his/her radio frequency tag in front of a tag reader attached to a label printer. The reader will communicate the tag ID to a staff database and extract the name of the person who is opening the new can of food. Then the labeling sub-system will generate a label which contains at least the name of the person, the time and day that the can is opened, and an expiration date for the can as illustrated in FIG. 13.

The expiration date for the can will be calculated from another database based on the type of food in the can. The type of food in the can will be determined by the automatic food labeler either by scanning the bar code of the can and searching it in a large database containing all possible food ingredients in the kitchen, or will be communicated by the user who would select it from a dropdown menu on the system touchscreen (or touchtone) or enter it by pressing buttons on an attached keyboard. Alternatively, the user may pronounce the name of the food in front of a microphone and the system would register it using a speech recognition technique. Optionally, the user may provide the system with the duration that the food will not be expired directly instead of indicating the type of food.

The automatic food labeler may optionally generate a unique bar code on the label. The system may also include a bar code reader and an inventory management system to track the storage and disposal of opened cans and food. In this implementation, the inventory system keeps track of opened cans and their expiration time. The staff will be asked to scan the bar code in the bar code reader before throwing the can in a trash or washing the container. Thus, the inventory management system keep track of the number of opened cans and other containers which are expired or close to expiration and generate a report for the manager. The system may also alert the kitchen or restaurant manager by providing a report about the expired food being kept in the refrigerators. It may also provide them with a list of opened cans or containers that contain foods which are close to be expired. This report helps the restaurant manager to manage usage or disposal of them to avoid spread of fungus and bacteria in the refrigerator. The inventory system may provide the alert or the report to manager's smartphone, tablets or desktop through web services, smart apps or short message service.

In one embodiment, the data of all generated labels will be stored in the central database for further reference.

With our system in place, major elements of organization would be connected through IoT platforms and provide constant feedback about each franchise unit which can be logged and used as a basis for first-tier inspection. Additionally, while it does not replace the necessity of in-person and un-announced inspections, it helps health organizations to have a better view of the food safety situation in each food processing unit on continuous basis.

Figure 14:
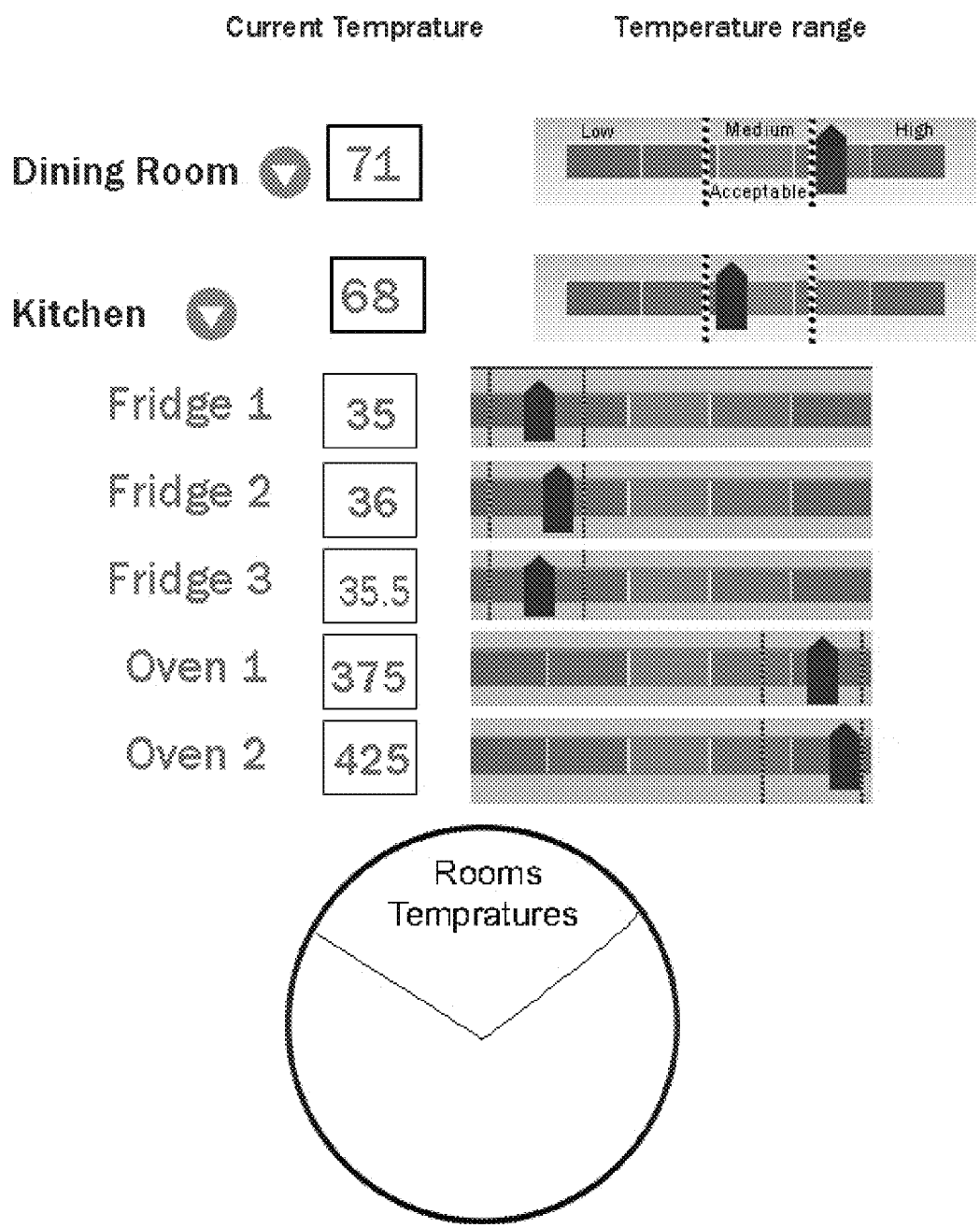
FIG. 14: Combined system of appliances and environment monitoring

FIG. 14 shows an example of a user interface design for combined appliances and environment monitoring system capable of displaying reports and alerts on managers' mobile device.

One skillful in the arts knows that similar techniques and apparatus can be used to generate automatic labels and monitor expiring medicine and medical materials (such as suture threads, anesthesia medicine) in hospitals and health provider facilities. In addition, similar hygiene monitoring techniques and apparatus may be used to monitor and reduce the spread of contamination between units and from health care providers to patients.

The invention claimed is:

1. A hygiene monitoring system for determining a compliance of a user with respect to a hygiene standard, said hygiene monitoring system comprising:
 a radio frequency (RF) tag, attached to the user, configured for identifying the user by an identity;
 a first RF tag reader;
 a first sensor configured for detecting a usage of a soap dispenser after a detection of the user, based on time stamps of events of the user indicating activities performed by the user, to be previously present at an insanitary location, the insanitary location being different from a first location where the hygiene standard compliance is required, wherein said first sensor is disposed within a range of detection of said RF tag by the first RF tag reader;
 a second sensor configured for detecting a duration a faucet is utilized after the usage of the soap dispenser, wherein said second sensor is disposed within the range of detection of said RF tag by the first RF tag reader, and
 a processor configured for determining the compliance of the user of the hygiene standard at the first location, wherein if said first sensor indicated the detection of the usage of the soap dispenser and if said second sensor indicated the duration the faucet is utilized exceed a threshold, the user is considered to have complied with the hygiene standard;
 wherein the processor is further configured to determine whether the user is located at the first location and complied or not to the hygiene standard.

2. The hygiene monitoring system of claim 1, wherein at least one of said first and second sensors become enabled on an adjustable duty cycle on a periodic basis.

3. The hygiene monitoring system of claim 2, wherein the duty cycle and period of enabling and disabling is different for different types of sensors.

4. The hygiene monitoring system of claim 2, wherein the duty cycle and period of enabling and disabling is adaptively controlled through a feedback from a battery of at least one of said first and second sensors.

5. The hygiene monitoring system of claim 1, wherein the second sensor is an acoustic sensor.

6. The hygiene monitoring system of claim 5 wherein a signal from the acoustic sensor is analyzed to show if the user rubs hands together under a water flow properly.

7. The hygiene monitoring system of claim 1, wherein the second sensor is a motion sensor.

8. The hygiene monitoring system of claim 1, wherein a second RF tag reader placed in a second location which is distant from the first location; and
 wherein the second RF tag reader identify if the user has visited the second location prior to standing in the vicinity of the first RF tag reader.

9. The hygiene monitoring system of claim 8, wherein the processor activate a flag if the user visited the second location and deactivate the flag only if the user stands by the faucet and is compiled with the hygiene standards.

10. The hygiene monitoring system of claim 9, wherein said processor provides an alert if hygiene code is violated by the user.

11. The hygiene monitoring system of claim 1, wherein data inferred by the first and the second sensors in conjunction with RF tag data read by the first RF tag reader are used by the processor to infer a sequence of events along with their time stamps.

12. The hygiene monitoring system of claim 11, wherein the sequence of events and their timestamps will be used by the processor to quantify a quality of washing hands by the user.

13. The hygiene monitoring system of claim 1, wherein the first RF tag is attached to a shoe, that is worn by the user.

14. The hygiene monitoring system of claim 1, wherein more than one type of RF tags are attached to the user, to improve accuracy of user localization by the system.

15. The hygiene monitoring system of claim 1, wherein the RF tag is of energy harvesting type.

16. The hygiene monitoring system of claim 1 further comprising:
 one or more temperature sensors installed on or inside restaurant appliances;
 an internet of things (IoT) gateway where data from said sensors is received through a wireless link, and
  retransmitted over a second wireless communication link to the said processor;
 wherein each of said one or more temperature sensors has a memory chip and a wireless transceiver, and
  stores a unique internet protocol (IP) address; and
 wherein said each of one or more temperature sensors measure the temperature on an adjustable duty cycle based on a first period and buffer their measured temperatures in their memory chips; and
 wherein said each of one or more temperature sensors transmit said buffered temperatures to said internet of things (IoT) gateway periodically based on a second period; and
 wherein the adjustable duty cycle and period of temperature measurement are different for different type of temperature sensors.

* * * * *